Figure 5:
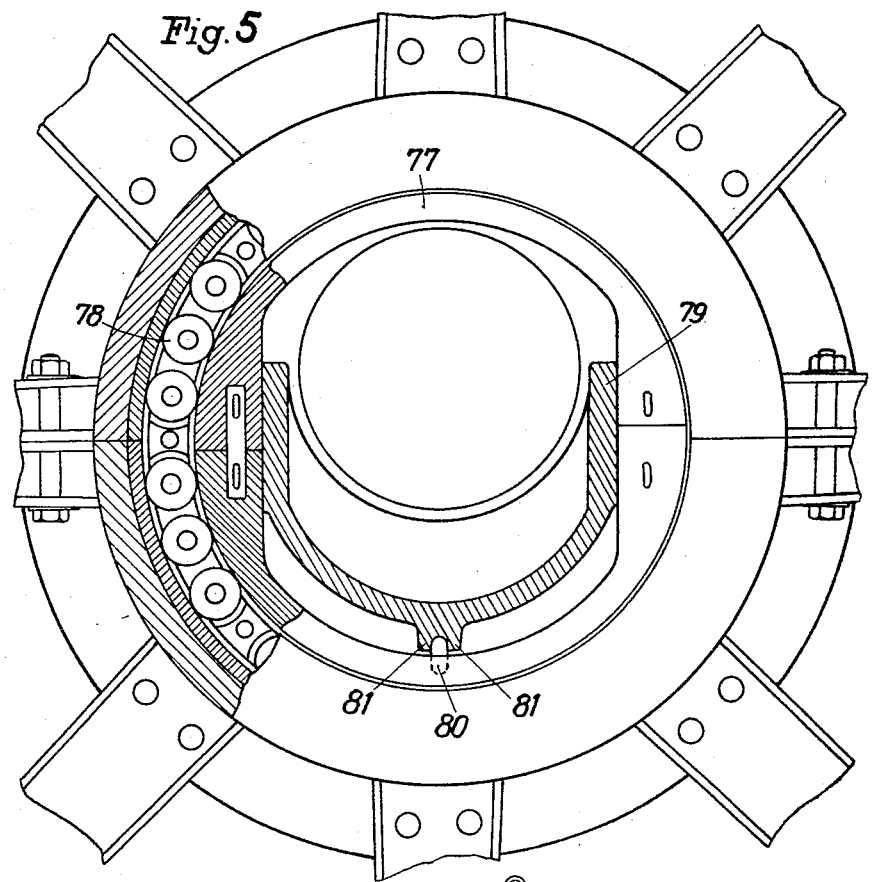

Oct. 20, 1931. O. OHNESORGE 1,828,255
ROPE GEARING AND THE LIKE
Filed May 14, 1930 4 Sheets-Sheet 1
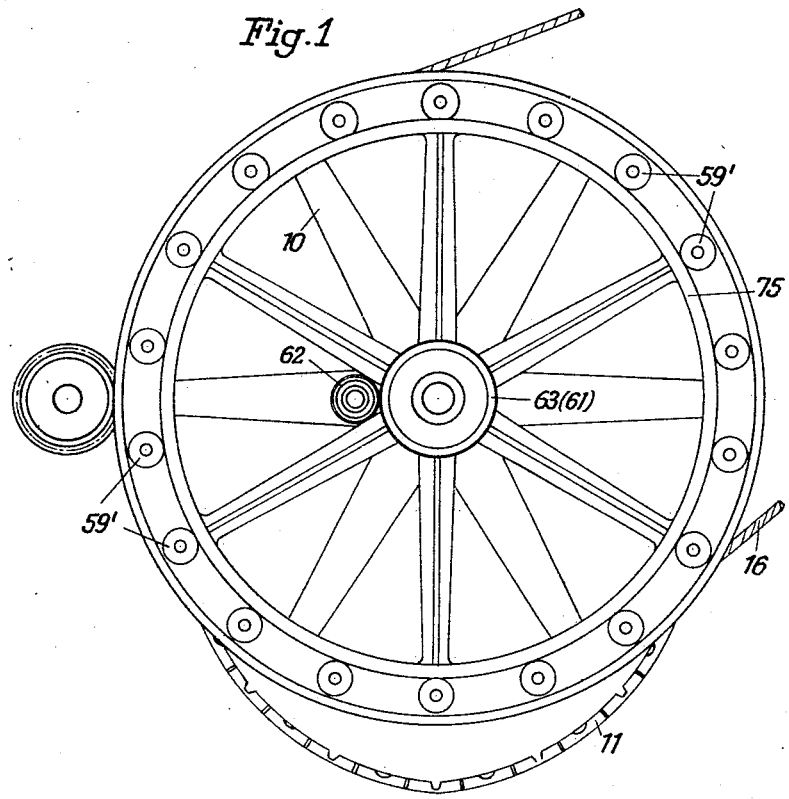
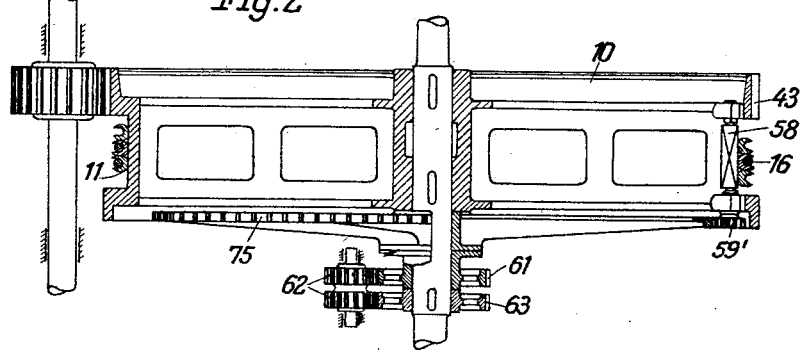
Inventor:
Otto Ohnesorge
By B. Singer, Atty.

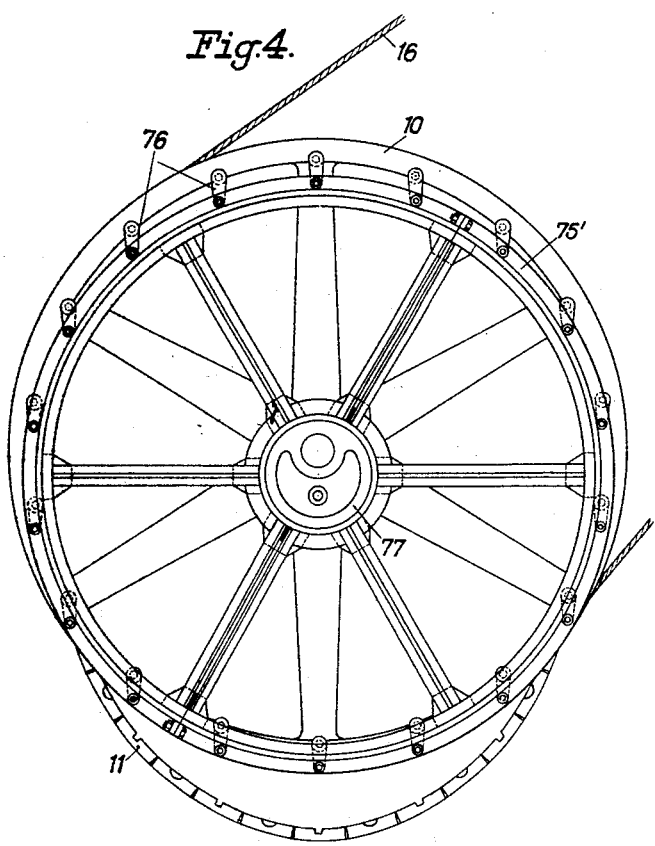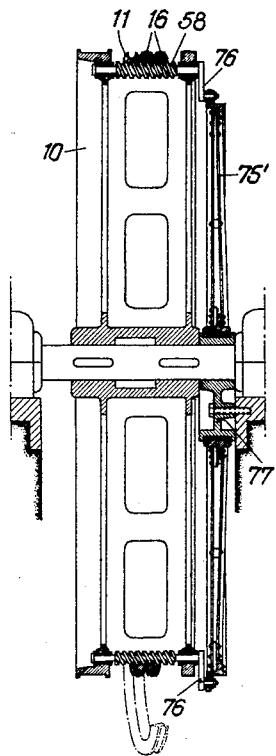

Oct. 20, 1931.   O. OHNESORGE   1,828,255
ROPE GEARING AND THE LIKE
Filed May 14, 1930   4 Sheets-Sheet 3

Oct. 20, 1931.  O. OHNESORGE  1,828,255
ROPE GEARING AND THE LIKE
Filed May 14, 1930  4 Sheets-Sheet 4

Inventor:
Otto Ohnesorge
By B. Singer, Atty.

Patented Oct. 20, 1931

1,828,255

UNITED STATES PATENT OFFICE

OTTO OHNESORGE, OF BOCHUM, GERMANY

ROPE GEARING AND THE LIKE

Application filed May 14, 1930, Serial No. 452,431, and in Germany May 18, 1929.

The invention is an improvement in, or modification of, the invention claimed in the specification filed with my application Serial No. 353,626. The parent specification is concerned with gearing wherein a pulley has coiled upon it, in approximately helical coils, a chain whose links form a track for the gear rope, cable or chain. The specification describes various devices for shifting the chain coils laterally on the pulley, so that room is constantly maintained for the oncoming coil, and these devices include worms mounted at the circumference of the pulley, with teeth engaging the track chain, so that rotation of the worms shifts or traverses the chain. For driving the worms the specification describes an arrangement of bevel gears, with spindles extending from the centre of the pulley to the circumference. Considerations of space limit the number of such spindles which can be provided, and consequently the number of worms. Generally speaking, it may be taken that not more than about six spindles can be conveniently provided, if they are confined to one side of the pulley, or about twelve, if they are on both sides, so that the number of worms on the pulley will not much exceed twelve in ordinary cases. For accurate transversing of the track chain, without sagging or dragging of portions not engaged with the traversing worms, it is, however, in most cases necessary to have more worms than this, say sufficient worms to engage alternate links of the chain, and the object of my present invention is to provide means for arranging and actuating a larger number of worms than can conveniently be done with the bevel gears and spindles shown in the parent specification.

To this end I use for actuating the worms a common centre wheel or disc, which is by appropriate driving gear coupled with all the worm spindles and is also in connection with some stationary, non-rotating part, so that in the course of rotation of the pulley the centre wheel rotates the worm spindles, imparting uniform shift or traverse to the coils of the track chain.

The centre wheel may, for example, be toothed and mesh with pinions on the worm spindles, and may be driven by means of differential gear, by the rotation of the pulley, to rotate at a higher or lower speed than the pulley. Another method, which has certain well marked advantages, consists in connecting the centre wheel to cranks on the worm spindles and mounting it on an axle which is eccentric to the pulley, to an extent equal to the length of the cranks. The axle of the centre wheel may in this case be in the form of a cam or eccentric sheave mounted on the pulley axle but restrained from rotating with the pulley. However, certain considerations arising in practice may render modifications of this simple arrangement desirable. The pulley axle is frequently of very substantial diameter, and there is generally a considerable amount of settling in the bearings, before the pulley has been properly "run in", so that there may be a loss of precision in the driving connections unless the mechanism is able to accommodate itself to the change. If the eccentric axle, dropping with the pulley axle, is in rigid connection with the part which restrains it from rotation, stresses may be set up which interfere with the smooth and even working of the cranks. This risk may be avoided by so connecting the eccentric axle to the part which restrains it from rotation that the restraint, though complete as regards preventing the axle from being turned by the thrust of the cranks and by friction, does not prevent such movement of the axle as may be required to enable it to accommodate itself to the settling of the pulley axle.

The invention is illustrated in the annexed drawings, showing three examples of construction in Figs. 1 and 2, Figs. 3 and 4 and Figs. 5 to 7 respectively.

Referring first to Figs. 1 and 2, the pulley 10 therein shown has a ring of teeth 43, for driving it by means of a pinion. The cable 16 is laid in grooves in the links of the track chain coiled on the pulley. At the circumference of the pulley are mounted worms 58, and the inside faces of the chain links are shaped for engagement with these worms, so that rotation of the worms shifts the chain coils across the pulley. The worms are so spaced that there is one for engaging each alternate link of the chain coils on the pulley. This engagement of alternate links is quite sufficient for shifting the chain coils evenly across the pulley, as there can be no sagging due to the single, intermediate links not engaged by the worms. The worm spindles have pinions 59', all engaged with a gear wheel 75 rotatable on the pulley shaft. Fixed to the gear wheel 75 is a gear wheel 61 in mesh with one of two gear wheels 62 of different sizes fixed to a countershaft, the other gear wheel 62 being in mesh with a gear wheel 63 fixed to the pulley shaft. The ratio of gearing is such that during each revolution of the pulley the worms 58 make one revolution, shifting the coils of the chain through a distance equal to the width of the chain links.

In the modification shown in Figs. 3 and 4 the worm spindles have crank arms 76 with crank pins engaging into holes in a wheel 75', which is rotatable on a fixed boss or cam 77, the latter being eccentric in relation to the pulley to an extent equal to the length of the crank arms. Rotation of the pulley causes the crank arms to rotate the wheel 75', the crank arms remaining parallel with each other in all positions and being themselves rotated, with the worm spindles. This crank gear works smoothly, and is very simple. In the absence of toothed gearing it is practically noiseless, even at high speeds.

In the case of pulleys of large diameter the use of the plain wheel or disc 75' clearly has certain advantages over a large toothed wheel 75 such as shown in Figs. 1 and 2. There is very little stress on the wheel 75', and the centrifugal forces due to the cranks balance each other, so that balance weights may generally be dispensed with.

Figure 7:
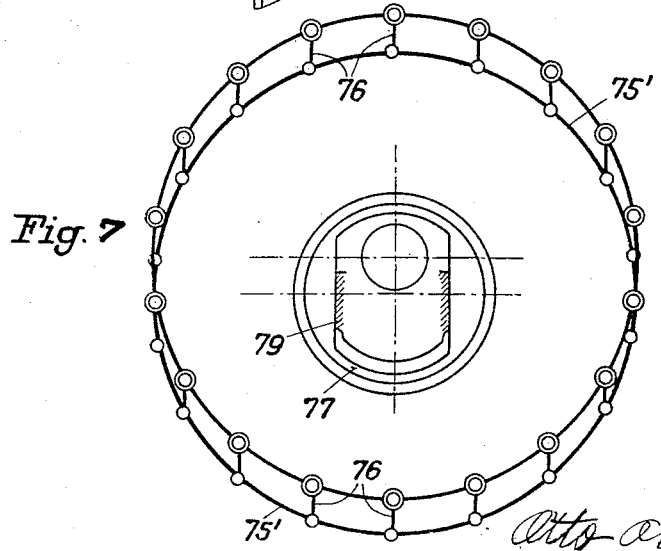
Figure 6:
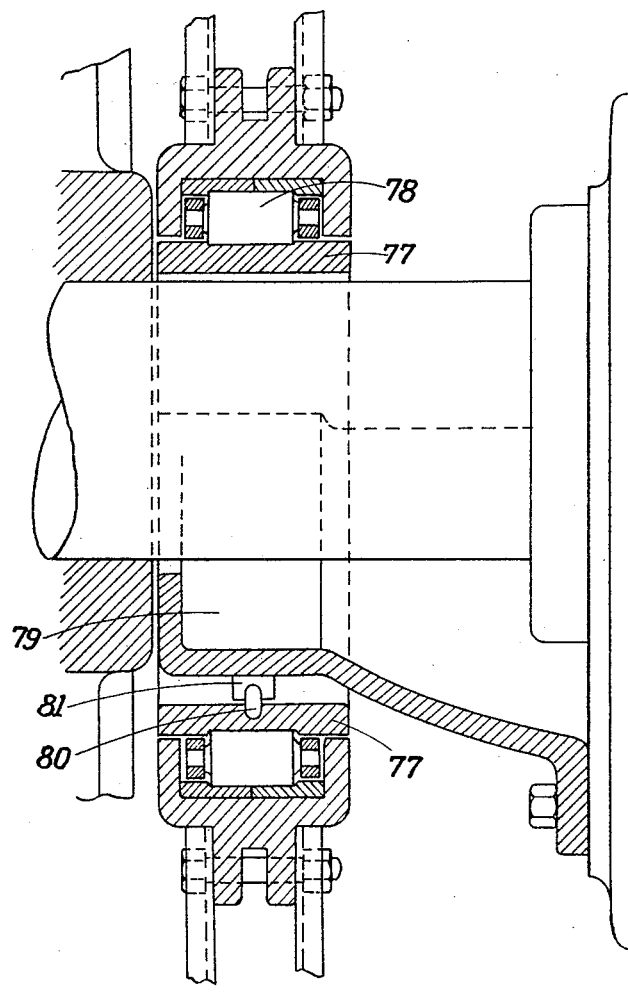

In the modification shown in Figs. 5 to 7 the ring or disc 75' is freely suspended from the cranks, without having its weight borne by the cam. The moderate weight of the disc is well distributed among the crank pins; the load due to this weight is always vertical, and the resultant of this load and the torque is only slightly greater than the torque itself. The cam 77, whose function is to hold the disc 75' substantially to a fixed centre, is within a roller bearing 78 in the hub of the disc 75', and has two internal, flat faces abutting slidably against faces of a stationary abutment 79, one or other of these faces taking the thrust due to the cranks, according to the direction of rotation of the pulley. To prevent any possibility of the cam becoming jammed on the abutment, due to the slight tendency of the disc 75' to rotate it by friction, the cam has at the bottom a nose 80 engaging between flanges 81 on the abutment. This prevents rotation without preventing vertical movement. It will be seen that if in course of time the main shaft gradually settles in its bearings the cam merely settles with it, without involving any stress or distortion. It is not essential to have the abutment faces vertical, as shown. They may be in any position, for example horizontal, but in that case the cam will bear the weight of the disc 75', and in case of settling of the shaft there will be a slight lateral shift of the cam, with all the cranks assuming a slightly and uniformly inclined position. If the pulley is always to rotate in the same direction this arrangement may be utilized to make the weight of the disc 75' partly balance the thrust of the cranks 76 on the cam 77.

What I claim is:

1. Rope or like gear wherein the pulley has at its circumference a series of worms for traversing the coils of the track chain, and has a centre wheel common to said worms, for driving the same, the said centre wheel being in connection with a stationary part, whereby it is in the course of rotation of the pulley caused to rotate the worms by driving them in parallel.

2. Apparatus as claimed in claim 1, wherein the worm spindles have pinions in mesh with teeth on the centre wheel, and the centre wheel receives its drive from the pulley by means of differential gear.

3. Apparatus as claimed in claim 1, wherein the worm spindles have cranks, all parallel with each other, engaged by their crank pins with the centre wheel, which is eccentric in relation to the pulley to an extent equal to the length of said cranks.

4. Rope or like gear wherein the pulley has at its circumference a series of worms for traversing the coils of the track chain, and has a centre wheel common to said worms, for driving the same, the said centre wheel being in connection with a stationary part, whereby it is in the course of rotation of the pulley caused to rotate the worms by driving them in parallel and wherein the worm spindles have cranks, all parallel with each other, engaged by their crank pins with the centre wheel, which is eccentric in relation to the pulley to an extent equal to the length of said cranks, and including means whereby the eccentric hub of the central gear is so supported that the central gear may adjust itself in accordance with the position determined by the worm cranks, independently of flaws in the machining or of deformations or temporarily in permanent connection and including fixed abutments which engage the hub for centrally absorbing the sum total of the reactions of the crank pressure.

OTTO OHNESORGE.